(12) United States Patent
Sturgeon et al.

(10) Patent No.: US 6,202,212 B1
(45) Date of Patent: *Mar. 13, 2001

(54) SYSTEM FOR CHANGING MODALITIES

(75) Inventors: Derrill L. Sturgeon, Houston; Kevin J. Brusky, Magnolia, both of TX (US)

(73) Assignee: Compaq Computer Corporation, Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/831,160

(22) Filed: Apr. 1, 1997

(51) Int. Cl.⁷ .............................. G09G 5/08; G06F 15/00; H04N 7/00
(52) U.S. Cl. ............................ 725/141; 725/59; 345/145; 345/157; 348/552
(58) Field of Search .................................. 348/6, 10, 552; 345/326, 327, 158, 157, 352, 353, 145, 146; 455/6.3; 340/825.21, 825.31

(56) References Cited

U.S. PATENT DOCUMENTS

| | | | |
|---|---|---|---|
| 4,621,259 | 11/1986 | Schepers et al. | |
| 4,760,386 | * 7/1988 | Heath et al. | 340/709 |
| 5,192,999 | * 3/1993 | Gracyck et al. | 348/552 |
| 5,237,653 | * 8/1993 | Noguchi et al. | 345/113 |
| 5,301,270 | * 4/1994 | Steinberg et al. | 345/326 |
| 5,537,152 | * 7/1996 | Ishikawa | 348/564 |

(List continued on next page.)

FOREIGN PATENT DOCUMENTS

| | | |
|---|---|---|
| 2248955 | 4/1992 | (GB) . |
| 8903085 | 4/1989 | (WO) . |
| 9518507 | 7/1995 | (WO) . |

OTHER PUBLICATIONS (Microsoft Windows and MS–DOS Operating System, Appndix D, pp. 374 and 375), 1993.*

(Mark Brown; Configuring Netscape for Video; Netscape Plug–ins; Using Netscape 2; pp. 475–496 & 969–998, respectively), 1995.*

(Aker; Interface Basics; The Macintosh Companion; pp. 72–96), 1991.*

European search report, Oct. 12, 1999, 3 pages.

* cited by examiner

Primary Examiner—Andrew Faile
Assistant Examiner—Reuben M. Brown
(74) Attorney, Agent, or Firm—Akin, Gump, Strauss, Hauer & Feld, LLP

(57) ABSTRACT

A method and apparatus allows users to quickly effect a modal change in an appliance having first and second modes. The apparatus captures a user actuation indicative of a modal change. The user actuation may be a mouse button closure, a keyboard button closure, or a remote control button closure. Upon detecting the user actuation indicative of a modal change, the apparatus detects the current mode for the appliance. Based on the current mode of the appliance, the apparatus cycles to the next mode in a round-robin basis and sets the next mode to become the current mode for the appliance. Further, in setting the next mode, the apparatus displays the next mode of the appliance as a mode change item in a menu list. The apparatus also then requests a second user actuation confirming a modal change. Further, in the event that the user confirms the modal change, the apparatus sets the next mode of the appliance to be the current mode for the appliance and maximizes the window associated with the mode of the appliance.

30 Claims, 13 Drawing Sheets

U.S. PATENT DOCUMENTS

| | | | | |
|---|---|---|---|---|
| 5,539,479 | | 7/1996 | Bertram | 348/564 |
| 5,548,340 | | 8/1996 | Bertram | 348/559 |
| 5,563,665 | | 10/1996 | Chang . | |
| 5,589,892 | | 12/1996 | Knee et al. | 348/731 |
| 5,598,183 | * | 1/1997 | Robertson et al. | 345/145 |
| 5,602,981 | * | 2/1997 | Hargrove | 345/352 |
| 5,606,374 | | 2/1997 | Bertram | 348/565 |
| 5,646,647 | * | 7/1997 | Chow | 345/145 |
| 5,650,831 | * | 7/1997 | Farwell | 348/734 |
| 5,675,390 | * | 10/1997 | Schindler et al. | 348/552 |
| 5,682,511 | * | 10/1997 | Sposato et al. | 345/353 |
| 5,689,667 | * | 11/1997 | Kurtenbach | 345/352 |
| 5,699,535 | * | 12/1997 | Amro | 345/342 |
| 5,706,448 | * | 1/1998 | Blades | 345/352 |
| 5,708,786 | * | 1/1998 | Teruuchi | 345/326 |
| 5,722,041 | * | 2/1998 | Freadman | 455/6.3 |
| 5,729,210 | * | 3/1998 | Kiriyama | 340/825.31 |
| 5,731,756 | * | 3/1998 | Roddy | 340/825.31 |
| 5,736,974 | * | 4/1998 | Selkar | 345/146 |
| 5,737,555 | * | 4/1998 | Gregg et al. | 345/145 |
| 5,748,189 | * | 5/1998 | Trueblood | 345/331 |
| 5,767,919 | * | 6/1998 | Lee et al. | 348/569 |
| 5,917,486 | * | 6/1999 | Rylander | 345/339 |
| 6,005,550 | * | 12/1999 | Vaughan et al. | 345/157 |

SYSTEM FOR CHANGING MODALITIES

BACKGROUND OF THE INVENTION

1. Field of the Invention

The present invention relates to modalities in a computer appliance, and more specifically, to an apparatus and a method for changing modalities of a home theater computer appliance.

2. Description of the Related Art

Remarkable improvements in computer hardware price/performance ratios during the last decade have caused major shifts in both home and office computing environments. Spiraling advances in semiconductor technology have enabled the appearance of personal computers with the computing power equivalent to supercomputers available a decade ago. Further, the advent of high performance audio and graphics sub-system has turned the personal computer into a multimedia device capable of saturating the user's audio-visual senses.

Along with the growth of computer usage, a new publishing medium called a World-Wide Web has gained rapid acceptance world wide. The World-Wide Web (WWW) is a system of documents and multimedia files that can be retrieved and viewed by any person who has access to the Internet. Originally developed as a network to facilitate communications among military and scientific research users, the Internet has since been expanded beyond its original defense orientation and is now being used world wide for a variety of commercial purposes.

The Internet proved to be a remarkable way for people to communicate and share information. However, in its native form, the interface of the Internet is so nonintuitive that only computer specialists could navigate the Internet. To overcome this problem, the World-Wide Web (WWW) is distributed across thousands of host computers attached into the system's communications network. The World-Wide Web is simply a series of communications of protocols representative of information in documents that could be linked to other documents and stored on computers throughout the Internet. Users of the Internet can access documents or pages via a program called a browser. Although early browsers were text-only, today's browsers offer windows-based icons, pull-down menus, bit-map graphics and colorful links to display hyper-text documents. Furthermore, the Web standard presents a system independent graphical user interface for users.

Due to its ability to tie together many disparate sources and its unified, easy to access user interface, the World-Wide Web is rapidly gaining acceptance as an information delivery media. The accessibility of audio and image files such as video over the World-Wide Web is also enabling the Internet to become a central repository suitable for entertainment as well. Hence, the collision between the Internet, the computer industry and the communications industry has resulted in the development of new appliances which satisfy computing, information gathering and entertainment needs of users. Thus, the graphical Web browser supports an information revolution and a cultural phenomenon.

In a related trend, the television (TV) industry has also been positively affected by advances in semiconductor technology. As TV sets are migrating from the older analog technology to digital technology, new features have been added that previously would have been impractical or cost prohibitive to implement. As digital TVs become mainstream, TV viewing is beginning to shift from a passive to an active experience. Applications such as home shopping, home banking, video-on-demand, and remote education have added to the utility of the ubiquitous TV sets. With digital set-top boxes and digital TVs, the difference between a computer and a TV starts to diminish.

The popularity of the Internet, coupled with the advent of digital TV sets, has accelerated the convergence of the computer and the TV industries. The TV-PC convergence is leading to products that share attributes of both the computer and the television unit so that Internet access, word processing, gaming, and TV watching are integrated into one unit. Although the convergence of the computer industry and the communications industry offers consolidated services which significantly improve the productivity and convenience for many users, to date, Internet capable devices have offered inconsistent and complex interfaces in communicating with users.

The problem arises as each device now has to provide multiple personalities or functionalities which had previously been provided in separate devices. The inconsistency of the user interface in these appliances often leaves the user with a less than satisfying experience, for these users are typically not technically oriented and demand dynamic products and services that adapt to their lifestyles rather than forcing them to adapt their lives to fit the needs of the device. As users want consistency and flexibility in the use of mobile devices, what the users require are devices that provide a consistent "look and feel" experience independent of the underlying application mode that the device is currently running. Thus, a need exists for a consistent, yet intuitive interface supporting a plurality of modalities to allow users the ability to easily switch amongst the different modes of the appliance and yet still retain the familiar graphical user interface available in current computers.

SUMMARY OF THE INVENTION

The present invention allows users to quickly effect a modal change in an appliance having first and second modes. The apparatus captures a user actuation indicative of a modal change. The user actuation may be a mouse button closure, a keyboard button closure, or a remote control button closure. Upon detecting the user actuation indicative of a modal change, the apparatus detects the current mode for the appliance. Based on the current mode of the appliance, the apparatus cycles to the next mode in a round-robin basis and sets the next mode to become the current mode for the appliance. Further, in setting the next mode, the apparatus displays the next mode of the appliance as a mode change item in a menu list. The apparatus also then requests a second user actuation confirming a modal change. Further, in the event that the user confirms the modal change, the apparatus sets the next mode of the appliance to be the current mode for the appliance and maximizes the window associated with the mode of the appliance.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

A. Glossary of Terms

For ease of reference, terms as defined for use in describing the present invention are set forth below. As will be evident to those skilled in the art, the definitions incorporate both current standard meanings as well as extended meanings as prove necessary. They include the following:

Actuation: an event generated by a user or by the computer, including but not limited to a mouse click, a keyboard entry, a remote control console click, or a software generated signal.

Appliance: an electronic instrument or device designed for a particular use, including a household or office device. Through processor intelligence, the appliance supports a plurality of modes of operation.

Mode: a particular functioning arrangement or condition with particular settings, flags, appearances that support behaviors associated with the particular functioning arrangement or condition.

Modal change: a transitioning from one mode to the next mode by applying a new group of settings, flags, appearances that support behaviors associated with the particular functioning arrangement or condition associated with the next mode.

B. The Preferred Embodiment

Figure 1A:
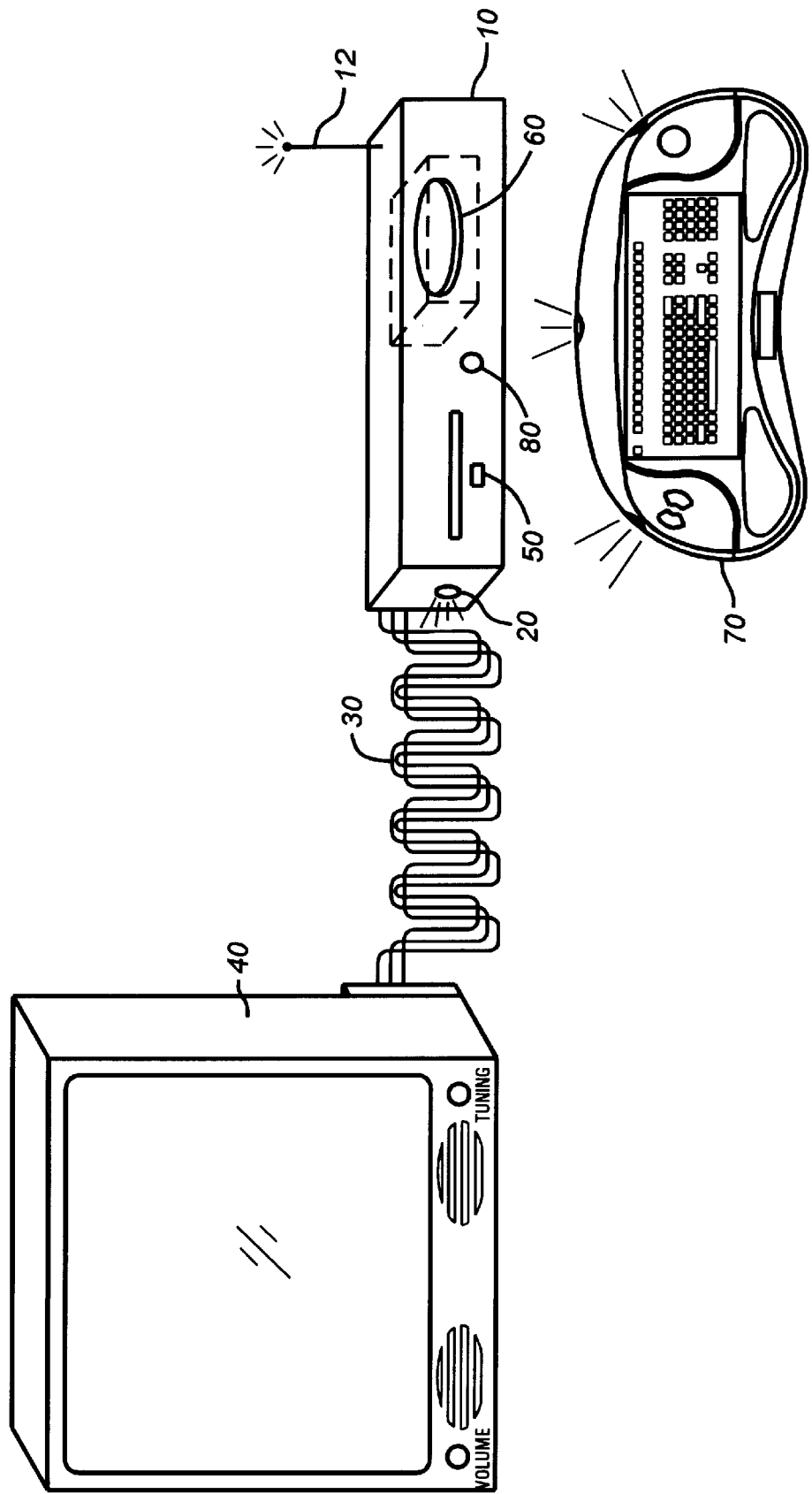
FIG. 1A is a perspective view of the home theater personal computer system in accordance with the present invention.

Turning now to FIG. 1A, a home theater computer system is shown. The home theater computer system of FIG. 1A provides computing capability as well as audiovisual theatrical projection capabilities. The home theater computer system of FIG. 1A revolves around a computer base unit 10 which is multimedia-capable. Multimedia refers to the integration of text, audio, graphics, still image, and moving pictures into a single computer-controlled product. It includes the combination of computers, video or compact disc players, video monitors, optical scanners, audio cards, music synthesizers, etc., all linked together by system software.

In the home theater computer system of FIG. 1A, the normal computer display which is optimized for viewing at 15–18 inches from the user's eyes is replaced with a high resolution display unit 40, which is preferably a large VGA compatible display (for example, 36-inch TV) with resolutions of 480×640 pixels. The display unit 40 is driven by the computer base unit 10 via a cable 30. The display unit 40 is capable of acting as either a computer monitor in one mode of the system or as a television unit in a second mode. When receiving TV transmission, the computer base unit 10 has an antenna 12 for receiving TV signals over the air waves.

The computer base unit 10 of FIG. 1A also contains a compact disc read only memory (CD-ROM) drive 60, a floppy drive 50, and a plurality of communications ports 20 and 80, preferably radio-frequency or infrared data ports. The communication ports 20 and 80 communicate with a keyboard 70. In addition, the computer housing 10 has an antenna 12 for receiving television transmissions. With respect to the keyboard 70, the keyboard 70 transmits serial information over one or more infrared connections thereby achieving wireless portability.

Figure 1B:
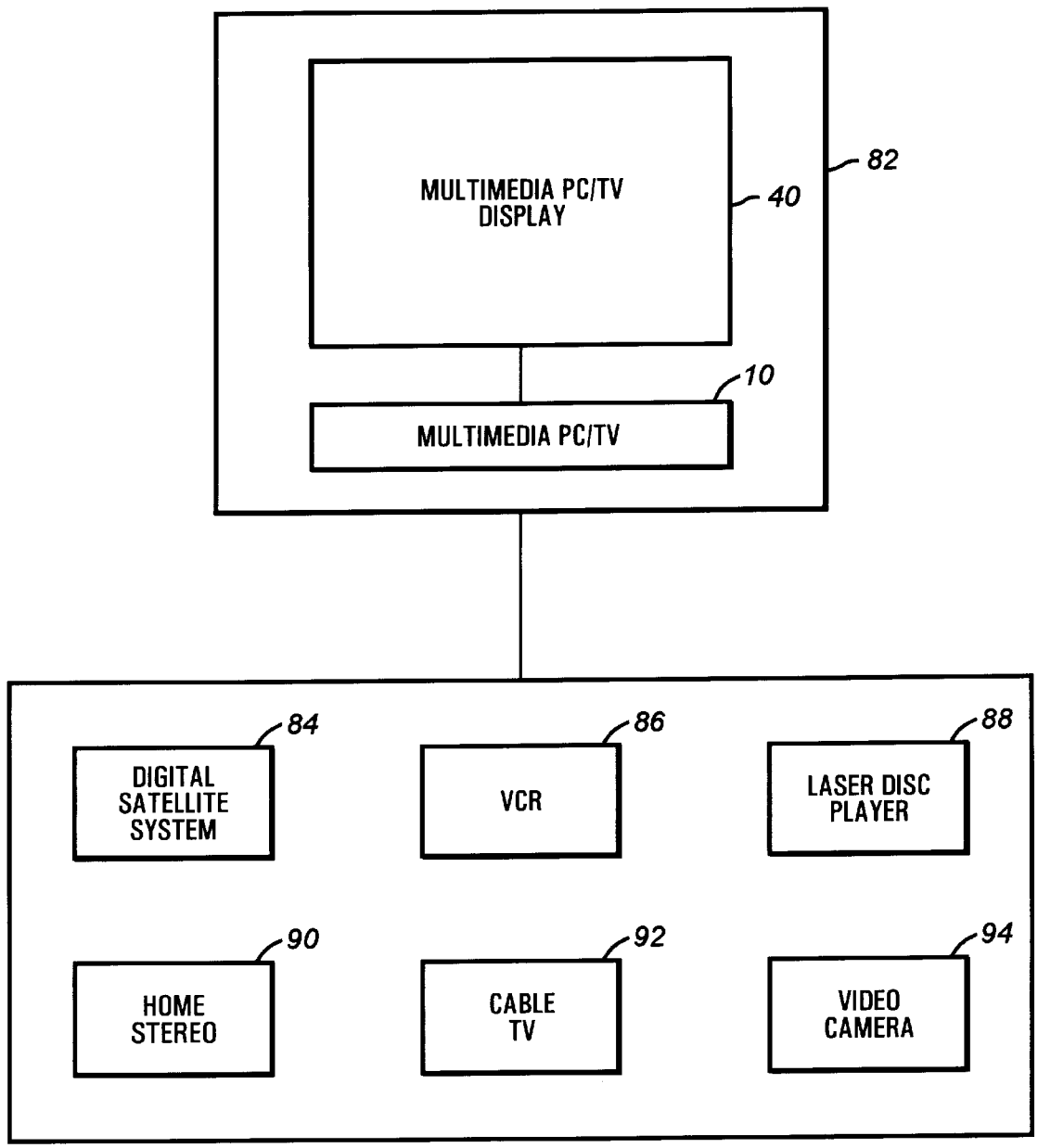
FIG. 1B is a block diagram showing additional aspects of the home theater personal computer system of FIG. 1A.

Turning to FIG. 1B, a block diagram showing additional aspects of the home theater computer system of FIG. 1A is shown. In FIG. 1B, the PC theater 82 of the home theater system includes the display unit 40 and the multimedia PC computer base unit 10. The PC theater 82 provides at least a PC mode and a TV mode. In the PC mode, the multimedia PC base unit 10 provides the necessary hardware. Further, as shown in FIG. 1B, the PC theater 82 can be connected to a variety of additional multimedia equipment, such as a digital satellite system 84, a VCR 86, a laser disc player 88, a home stereo 90, cable TV 92 or a video camera 94. In this way, the home theater system provides and integrates various multimedia functions.

Figure 2:
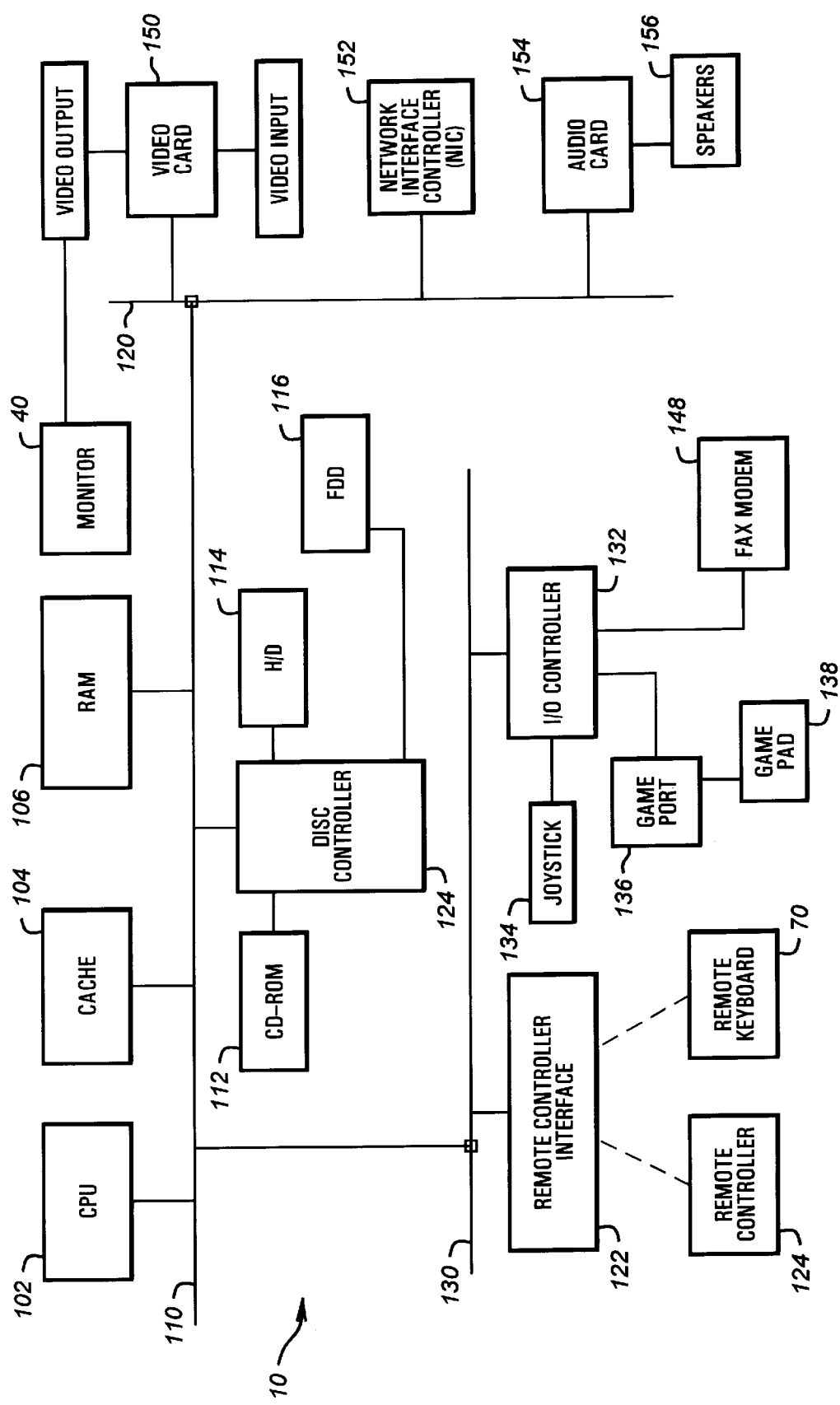
FIG. 2 is a schematic diagram of the computer architecture of the home theater personal computer system of FIG. 1A.

Referring now to FIG. 2, a simplified block diagram of the computer base unit 10 is shown including a video card 150. A central processing unit 102 is coupled to a host bus 110. The central processing unit 102 may be a single microprocessor, such an Intel Corporation's 80486 or Pentium with MMX capability, or a more complete CPU system including multiple microprocessors, a cache controller, external coprocessors, and other components, coupled to one another or to the host bus 110. The host bus 110 functions to interface the CPU 102 to the rest of the computer base unit 10. The host bus 110 typically is located on a motherboard, but may be configured as any of a number of other subsystems, as known in the art.

Also coupled to the host bus 110 is a cache 104. The cache 104 may be a write through, a write back, or a multi-level cache system for storing commonly used or recently used data values. The cache 104 generally consists of a high speed static RAM structure, addressable within the memory space of the CPU's address lines.

A main memory, typically comprising a dynamic RAM 106, is coupled to the host bus 110. The main memory provides relatively high speed data storage for instructions and data needed for the processor to perform its functions.

Also included in many computer systems is a dedicated ROM (not shown) providing system BIOS and other firmware sets of instructions to the processor, on initial bootup and also thereafter.

Also coupled to the host bus 110 is a disc controller 118. The disc controller 118 typically has a number of IDE ports to couple external devices. The disc controller 118 may be coupled directly to the CPU or to main memory, or may be a separate device on the host bus 110. The disc controller 118 provides a connection to the CD ROM 112, a hard disc 114, a remote controller interface 122, and an input/output controller 132, and a floppy disc drive 116. The CD ROM 112 provides optical storage and data retrieval capabilities, and the hard drive 114 and floppy disc drive 116 provide magnetic storage device capabilities to the computer system.

Also coupled to the host bus 110 are two extension buses. The first extension bus is a PCI bus 120, coupled to the host bus 110 via a PCI bridge. The PCI bus 120 is coupled to a plurality of additional devices, including the aforementioned video card 150, a network interface controller 152, an audio device or audio card 154, and in some embodiments an additional PCI bridge (not shown). The video card 150 typically includes a graphics processor and a video graphics adapter, and a video output of video card 150 is coupled to a monitor 40 via a coaxial cable 30 or other computer connector. The audio device 154 generally is coupled to audio speakers 156 or other audio output device to provide an audio output.

A second extension bus 130 is coupled to the host bus 110, providing an extension for additional peripheral components. Although typically configured as an X-bus or an ISA bus, the extension bus 130 may alternately be configured as an EISA, a PCI bus, a Microchannel bus, or any of a variety of other bus structures commonly used and known.

The remote controller interface 122, coupled to the second extension bus 130, provides infrared signal detection, and is optically and remotely coupled to a remote keyboard 70 and a remote controller 124. The remote keyboard 70 and remote controller 124 allow a human user or an external device to communicate data via the remote controller interface 122 to the computer base system 10, without direct wired connection.

The input/output controller 132, also coupled to the second extension bus 130, provides connection between the extension bus 130 and various devices, including a joy stick 134, a game port 136 coupled to a game pad 138, and a fax modem 148. Although these devices are shown coupled through the input/output controller 132 to the extension bus 130, it will be recognized that other configurations are possible; for example, the joy stick 134 may instead be coupled to an infrared device for communicating directly to the remote controller interface 122.

It will be recognized that additional devices may be coupled via IDE controllers and other connectors to the various buses, providing resources and buffering for external devices. The flexibility of the computer system therefore is not restricted to the particular example shown in the figure.

Although not shown, the operating environment and the communications network where the present invention is practiced is discussed next. The home theater computer system of FIGS. 1A, 1B and 2 are connected to the Internet through a local Internet service provider (ISP) via a wide area network, including an analog telephone line using an analog modem, an integrated services data network (ISDN) line using an ISDN modem, or a cable system using a cable modem, among others.

As discussed earlier, the Internet can provide a communication backbone for a system implemented according to the present invention. The Internet is a network linking other networks. The primary elements of the Internet are host computer systems that are linked by a backbone telecommunications network. The network is similar to a special purpose telephone line that is always open and talking to host computers. A system of advanced protocols tells these computers how to locate and exchange data with one another, passing information from computer to computer as the system seeking information reaches the system that houses the desired data. Packets of information are detoured around nonoperative systems if necessary, until the information finds its way to the proper destination.

Preferably, the computers communicate over the network using the same language or protocol called transmission control protocol/Internet protocol (TCP/IP). Furthermore, although some computer networks may not provide TCP/IP capability, they may still communicate with the Internet through one or more gateways that can actually be a host that passes certain types of data such as e-mail between networks. Additionally, although not shown, multiple networks could be linked together and connected to the Internet via a hub that enables computers on these networks to talk to one another and to other computers elsewhere on the Internet.

Figure 3:
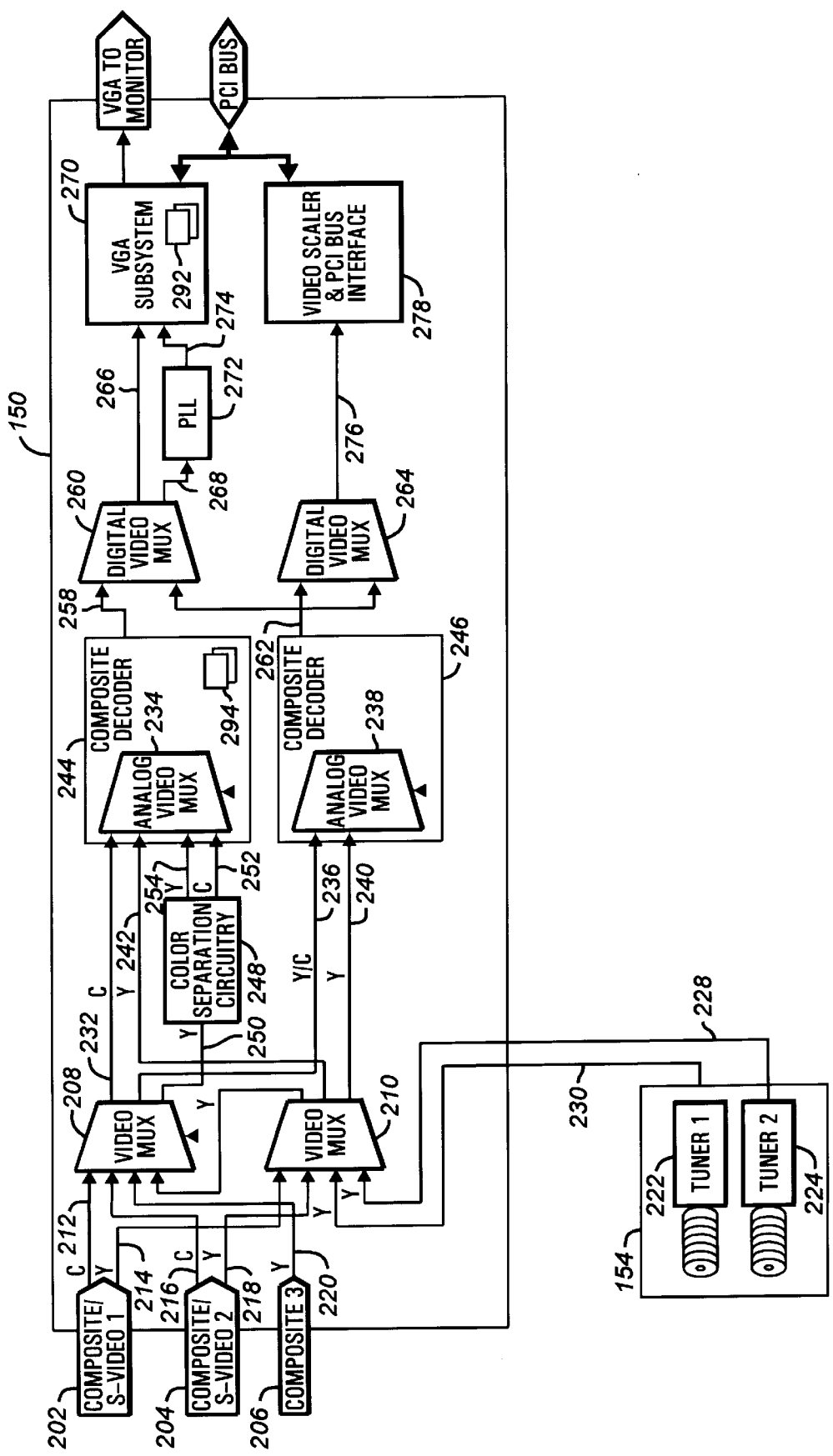
FIG. 3 is a schematic diagram of a video card of the home theater personal computer system of FIG. 2.

Turning to FIG. 3, a schematic diagram of the video card 150 of the home theater system of the present invention is shown in more detail. The inputs to the video card 150 include three composite video signals, Composite/S-Video_1 202, Composite/S-Video_2 204, and Composite_3 206. The constituent signals of the three input composite signals are provided to a pair of video multiplexers 208 and 210. The chrominance signal 212 from the S-Video_1 signal 202 is provided to video multiplexer 210 and the luminance signal 214 of the S-Video_1 signal 202 is provided to video multiplexer 210. The chrominance signal 216 of the S-Video_2 signal 204 is provided to video multiplexer 208, and the luminance signal 218 of the S-Video_2 signal is provided to video multiplexer 210. The composite_3 signal 206 includes a luminance signal 220 which is provided to video multiplexer 208. Tuners 222 and 224 located on the audio card 154 of the computer base unit 10 also provide input luminance signals 228 and 230 to video multiplexer 210. Other devices that are provided on the audio card 154 are not shown as the audio card is not critical to an understanding of the invention.

The chrominance signal 232 outputted from video multiplexer 208 is provided to an primary analog video multiplexer 234. Video multiplexer 208 also provides a Y/C signal 236 to a secondary analog video multiplexer 238. Video multiplexer 210 provides two luminance signals 240 and 242, one luminance signal 242 is provided to the primary analog video multiplexer 234, and the other luminance signal 240 is provided to the secondary analog video multiplexer 238. The primary analog video multiplexer 234 is integrated into a primary video composite decoder 244, and the secondary analog video multiplexer 238 is integrated into a secondary video composite decoder 246. The primary wider composite decoder 244 in the embodiment of the present invention may or may not include color separation circuitry. The video card 150 in the present embodiment includes color separation circuitry 248 external to the primary wider composite decoder 244. The color separation circuitry 248 receives a luminance signal 250 as an input from video multiplexer 208 and outputs a chrominance signal 252 and a luminance signal 254 to the primary analog video multiplexer 234 of the primary wider composite decoder 244. The color separation circuitry 248 includes a digital comb filter 256. Within the digital comb filter 256, video information is converted from analog to digital and back to analog. The decoded video signal 258 outputted by the primary video composite decoder 244 is provided to a primary digital video multiplexer 260. Similarly, the output video signal 262 of the secondary video composite decoder 246 is provided to a secondary multiplexer 264.

The primary digital video multiplexer 260 provides two outputs 266 and 268. One output 266 is provided directly to the VGA subsystem 270. The other output 268 is directed to a phased-lock-loop 272 (PLL). The PLL 272 supplies a clock signal 224 to the VGA subsystem 270. The VGA subsystem 270 has two memory areas; one area is used as an off-screen memory area for storing video information such as font information and data yet to be displayed. The other memory area is used to store data which is currently being displayed. The VGA subsystem 270 also includes a VGA controller. In displaying data, the VGA controller reads from the off-screen memory, scales the data if needed, performs color space conversion, and then sends the data through a digital-to-analog converter (DAC) to the display. In the secondary path, the secondary digital video multiplexer 264 provides a signal 276 to a video scaler and PCI bus interface 278. When data is sent over the secondary path, the data is downscaled if needed and then burst over the PCI bus 120 into the off-screen memory area of the video memory. The secondary path is typically used for picture-in-picture (PIP) functionality or pulling up web pages while watching television on the display 40.

Figure 4:
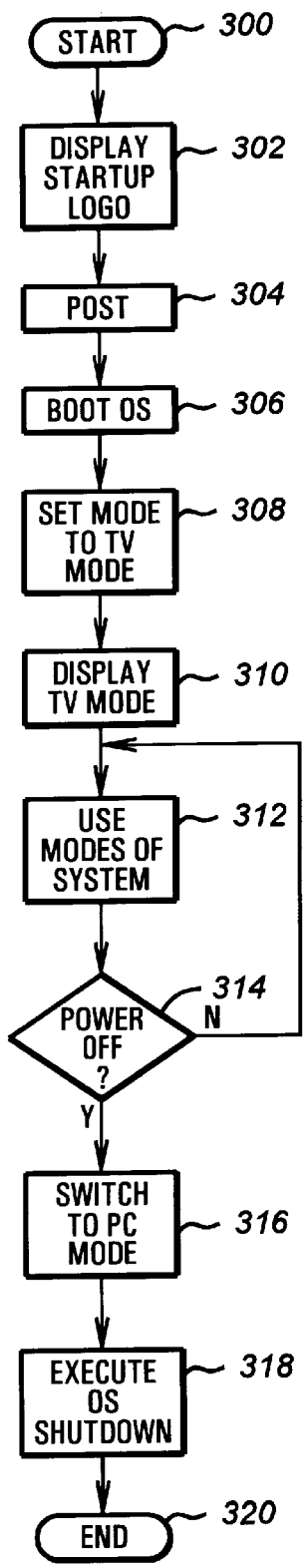
FIG. 4 is a flowchart of the operation of the home theater personal computer system of FIG. 1A.

Turning now to FIG. 4, the operation of the home theater personal computer of FIG. 1A is illustrated in detail. In FIG. 4, from the start step 300, the routine proceeds to step 302 where it displays a start-up logo, typically the logo of the manufacturer. From step 302, the routine proceeds to step 304 where it performs a power on self test (POST). Next, from step 304, the routine of FIG. 3 proceeds to step 306 where the operating system is booted. Preferably, the computer system boots a Windows 95 operating system, available from Microsoft Corporation of Redmond, Wash.

From step 306, the routine proceeds to step 308 where it sets the current mode to the TV mode. Next, in step 310, the window for the default TV mode is displayed. The TV mode is selected to be the default mode such that a consumer can simply plug in the home theater personal computer system of the present invention and have the system power up as a familiar television unit. From step 310, the user then proceeds to use the system in step 312. The use of the system is illustrated in more detail in the state machine of FIG. 5. From step 312, the routine of FIG. 4 checks whether the user wishes to power off the system in step 314. If not, the routine of FIG. 4 loops back to step 312 to continue using the system. Otherwise, in the event of a power-down, the routine proceeds from step 314 to step 316 where it places the system in the PC mode. From step 316, the Windows 95 shutdown procedure is executed in step 318 before the routine exits in step 320 and the user can power-down the machine.

Figure 5:
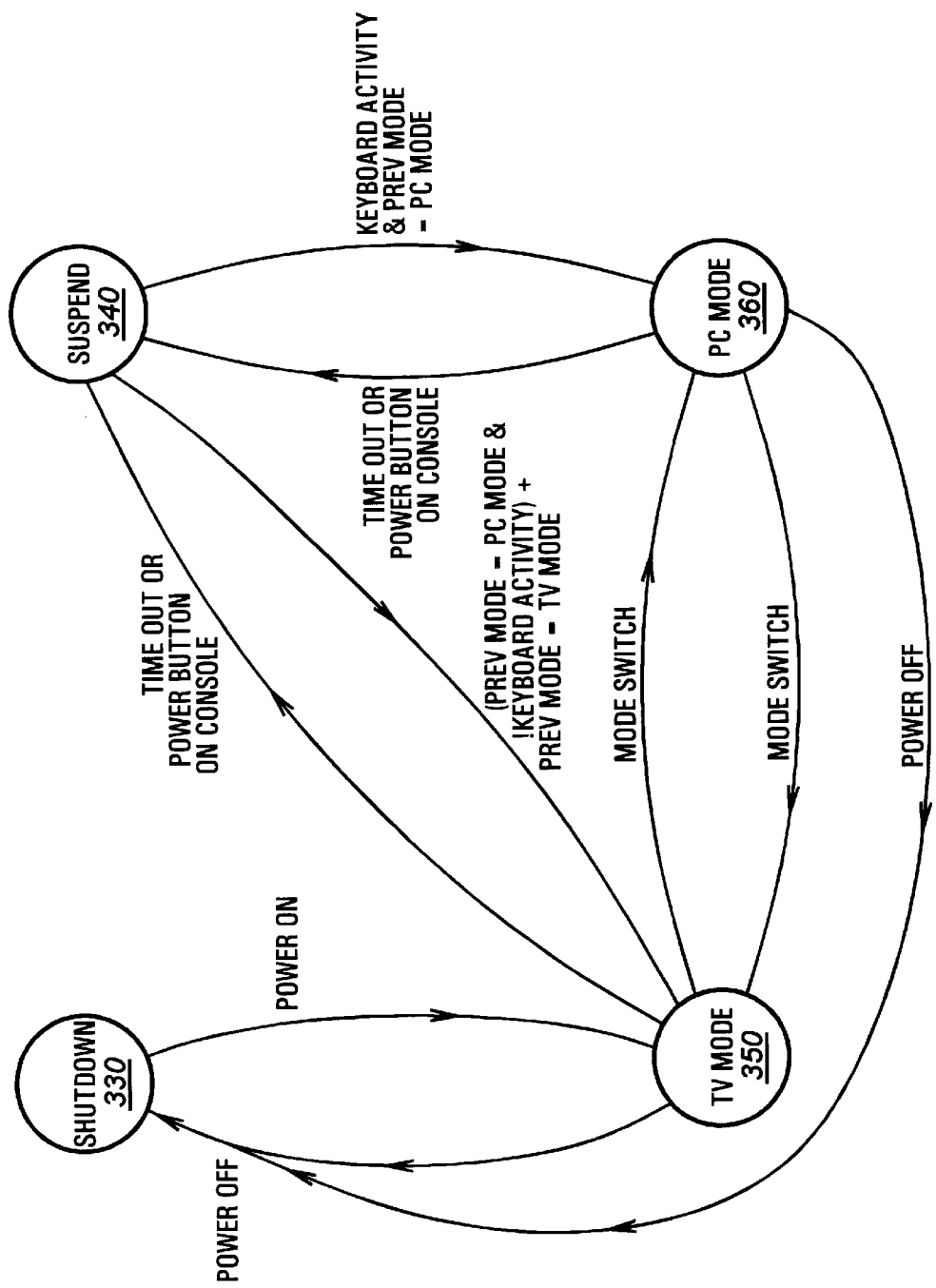
FIG. 5 is a state machine illustrating the transitions between the modes of the home theater computer system in accordance with FIG. 4.

Turning now to FIG. 5, the state machine illustrating in more detail step 312 of FIG. 4 is shown. In FIG. 5, four major states of the system are provided: a ShutdownMode 330, a SuspendMode 340, a TVMode 350 and a PCMode 360. Upon power-up initialization, the system of FIG. 5 proceeds from the state ShutdownMode 330 to the state TVMode 350. From the state TVMode 350, in the event of a timeout signal or that a power button on the console on the remote console has been actuated, the state machine of FIG. 4 transitions from the state TV_Mode 350 to the state SuspendMode 340. Further, upon receiving a power off command from either the keyboard or the remote control unit, the state TVMode 350 and the state PCMode 360 proceed to the state ShutdownMode 330. Further, the state TVMode 350 transitions to the state PCMode 360 on receipt of a mode switch command, as discussed in FIGS. 6–15.

In the state PCMode 360, in the event that a timeout or a power button on the remote console has been actuated, the home theater computer system of FIG. 1A transitions from state PCMode 360 to the state SuspendMode 340. On the other hand, from the state SuspendMode 340, in the event that the previous state was a PCMode state 360 and there was no keyboard activity or in the event that the previous state was a TVMode state 350, the state machine of FIG. 4 transitions from state SuspendMode 340 to the state TVMode of 350. Correspondingly, in the event that the state machine is in state 340, if keyboard activity occurred and the previous state was the state PCMode 360, the state machine transitions from the state SuspendMode 340 back to the PC mode 360. Further, from the state PCMode 360, in the event that the user requests a mode switch or a modal change, the state machine of FIG. 5 transitions from the state PCMode 360 to the state TVMode 350 to complete the modal change as requested.

Figure 6:
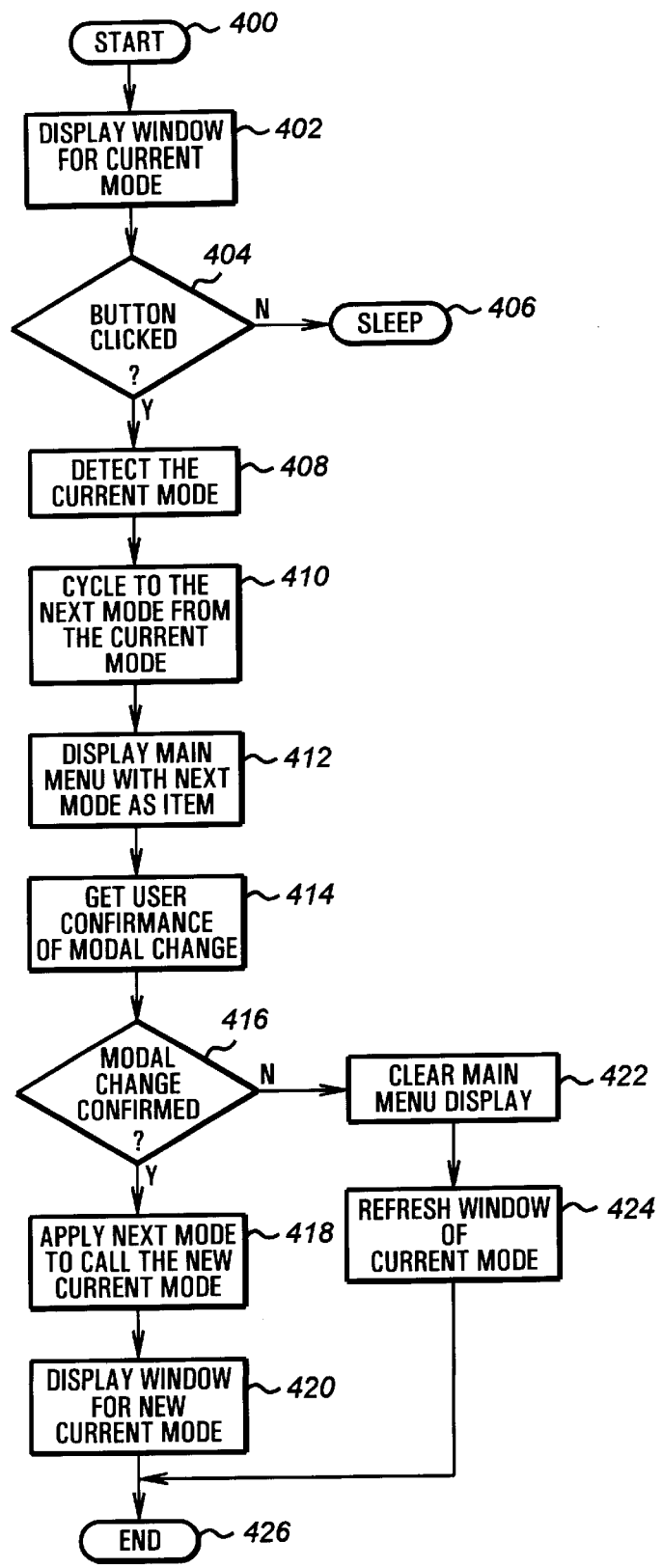
FIG. 6 is a flow chart illustrating the process for transitioning from one mode to another mode in the home theater personal computer system of FIG. 1A.

Referring now to FIG. 6, the process for requesting and accepting a modal change in the home theater personal computer system of FIG. 1A is illustrated in more detail. From the start step 400, the routine of FIG. 6 proceeds to step 402 where it displays the respective window for the current mode. Next, from step 402, the routine proceeds to step 404 where it checks whether the user has requested a modal change. In the preferred embodiment, this is accomplished by depressing or actuating a specific button on the mouse, keyboard or on the remote console unit.

In step 404, in the event that the modal change button has not been selected or clicked, the routine of FIG. 6 proceeds to step 406 where the system sleeps until the button has been actuated. In the event that the modal change has been requested as detected by the closure of the button in step 404, the routine of FIG. 6 transitions to step 408 where it detects the current mode that the home theater personal computer system of FIG. 1A is in. Preferably, this is accomplished by reading a semaphore which reflects the current mode of the entire system. From step 408, the routine then proceeds to step 410 where it cycles from the current mode to the next available mode in a round-robin fashion, as illustrated in more detail in FIG. 7.

From step 410, the routine of FIG. 6 proceeds to display a main menu such as a main menu 490 (FIG. 9), along with the next mode detected in step 410 set as an active item in step 412. Next, the routine obtains a user confirmance of the modal change in step 414. Preferably, this is accomplished by detecting a second button closure. From step 414, in the event that the modal change has been confirmed in step 416, the routine proceeds to step 418 where it applies the next mode as the new current mode in step 418. From step 418, the routine of FIG. 6 proceeds to step 420 where the window corresponding to the new mode is displayed. From step 420, the routine of FIG. 6 exits via step 426.

From step 416, in the event that the modal change was cancelled, such as when the user actuates a cancel button or when a user moves the cursor outside of the active region corresponding to the next mode item, the routine of FIG. 6 proceeds from step 416 to step 422 where it clears the main menu and refreshes the window of the current mode in step 424 before the routine exits in step 426.

Figure 7:
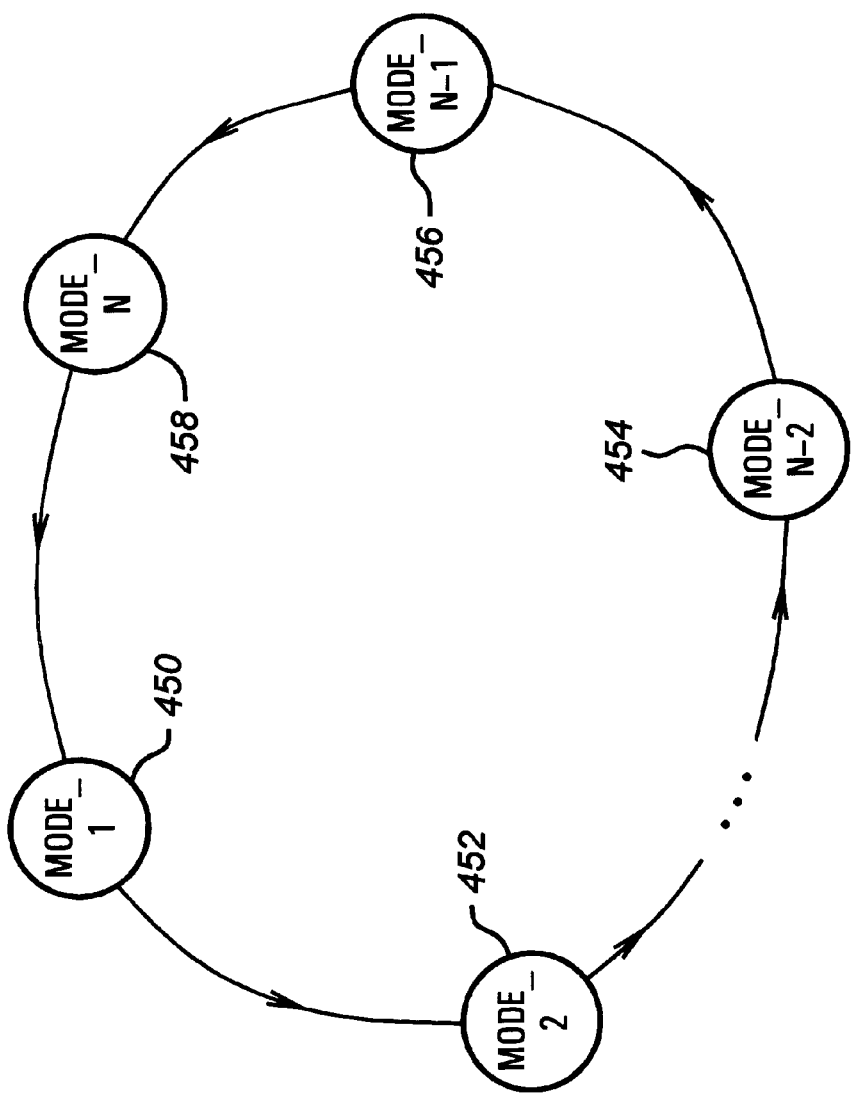
FIG. 7 is a state machine illustrating the modal cycling in accordance with the flow chart of FIG. 6.

The cycling of the next mode from the current mode in step 410 of FIG. 6 is illustrated in more detail in FIG. 7. As shown in FIG. 7, a plurality of modes MODE_1 450, MODE_2 452, MODE_N-2 454, MODE_N-1 456, and MODE_N 458 are shown. In accordance with FIG. 7, the home theater personal computer of FIG. 1A has N possible modes that are cycled sequentially from one to the next in increasing order.

Figure 8:
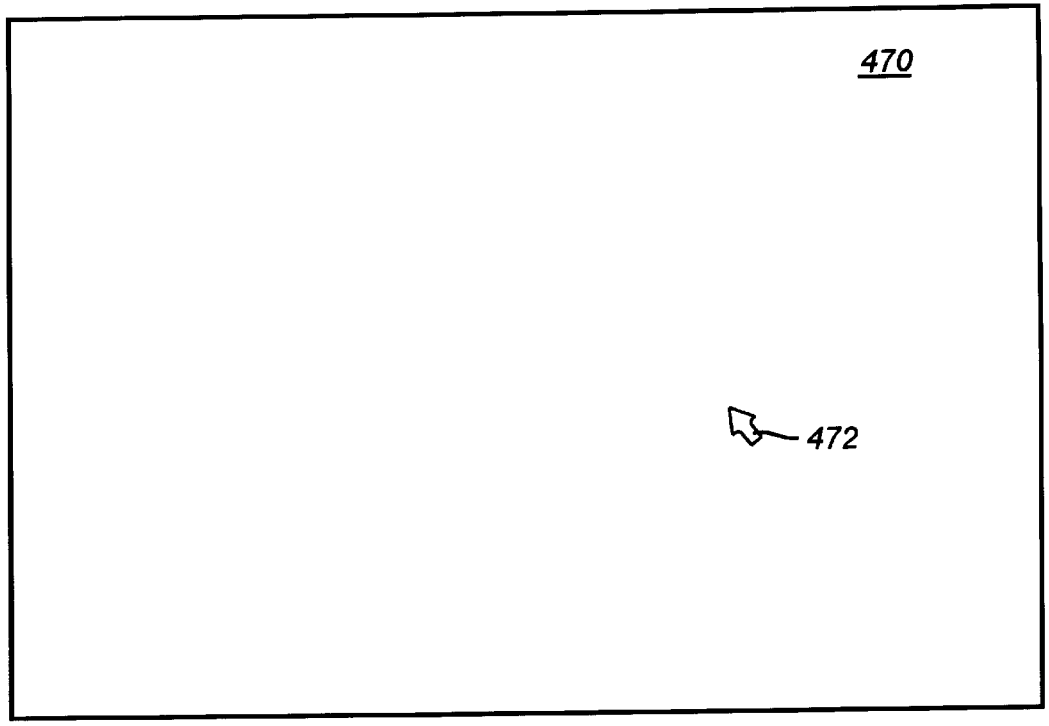
FIG. 8 is an illustration of a display screen prior to the modal change request.
Figure 9:
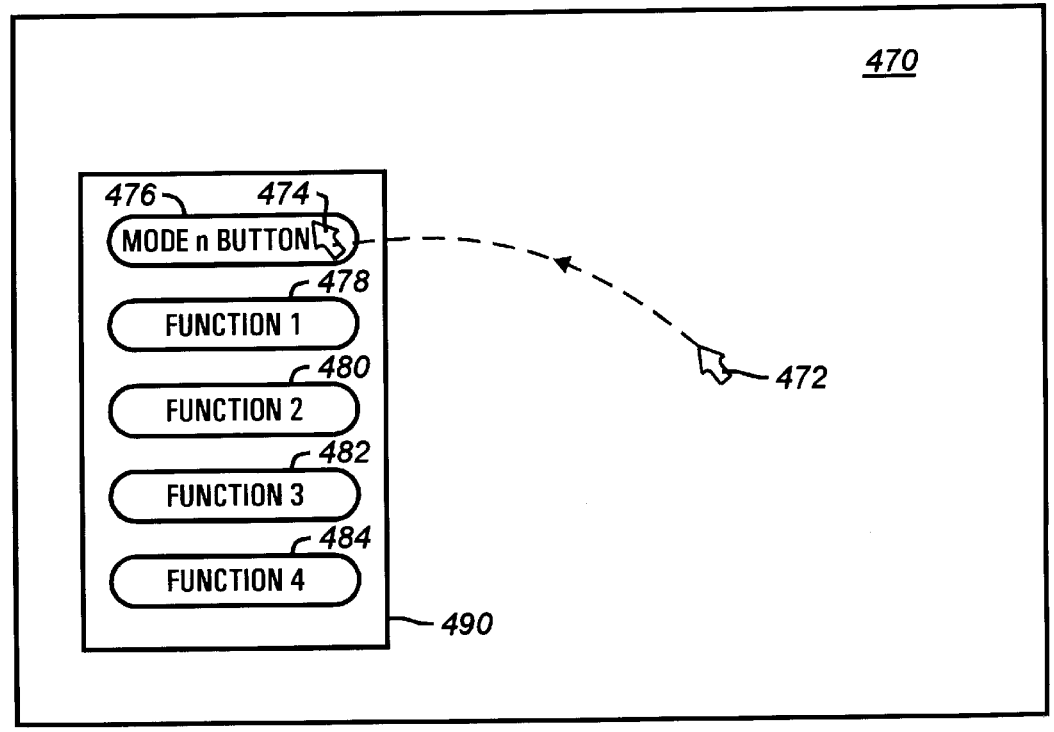
FIG. 9 is an illustration of a display screen and a main menu when a modal change has been requested.

The impact of the modal change or cycling from one mode to the next is illustrated in more detail in FIGS. 8 and 9. As shown in FIG. 8, the home theater personal computer system of FIG. 1A provides a display region 470 and a cursor 472 positioned in the display region 470. Upon detecting a modal change request, a main menu 490 is overlayed above the window or region 470 of the application for the existing mode, as shown in FIG. 9. The main menu 490 of FIG. 9 has a plurality of buttons for performing different functions, including a MODEn button 476, a Function1 button 478, a Function2 button 480, a Function3 button 482 and a Function4 button 484. Furthermore, upon the actuation of the mode change request, the cursor 472 is moved from its original position in FIG. 8 and parked over the MODEn button 476 in its new position 474. The automatic parking of the cursor over the mode change is provided as a convenience such that the user can change mode quickly without resorting to maneuvering the cursor.

Turning now to FIGS. 10, 11, 12, 13, 14 and 15, the process for performing the modal change in the preferred embodiment is illustrated in detail. In the preferred embodiment, two modes are available: a Watch TV mode for viewing video playback and a Use PC mode for operating the computer.

Figure 10:
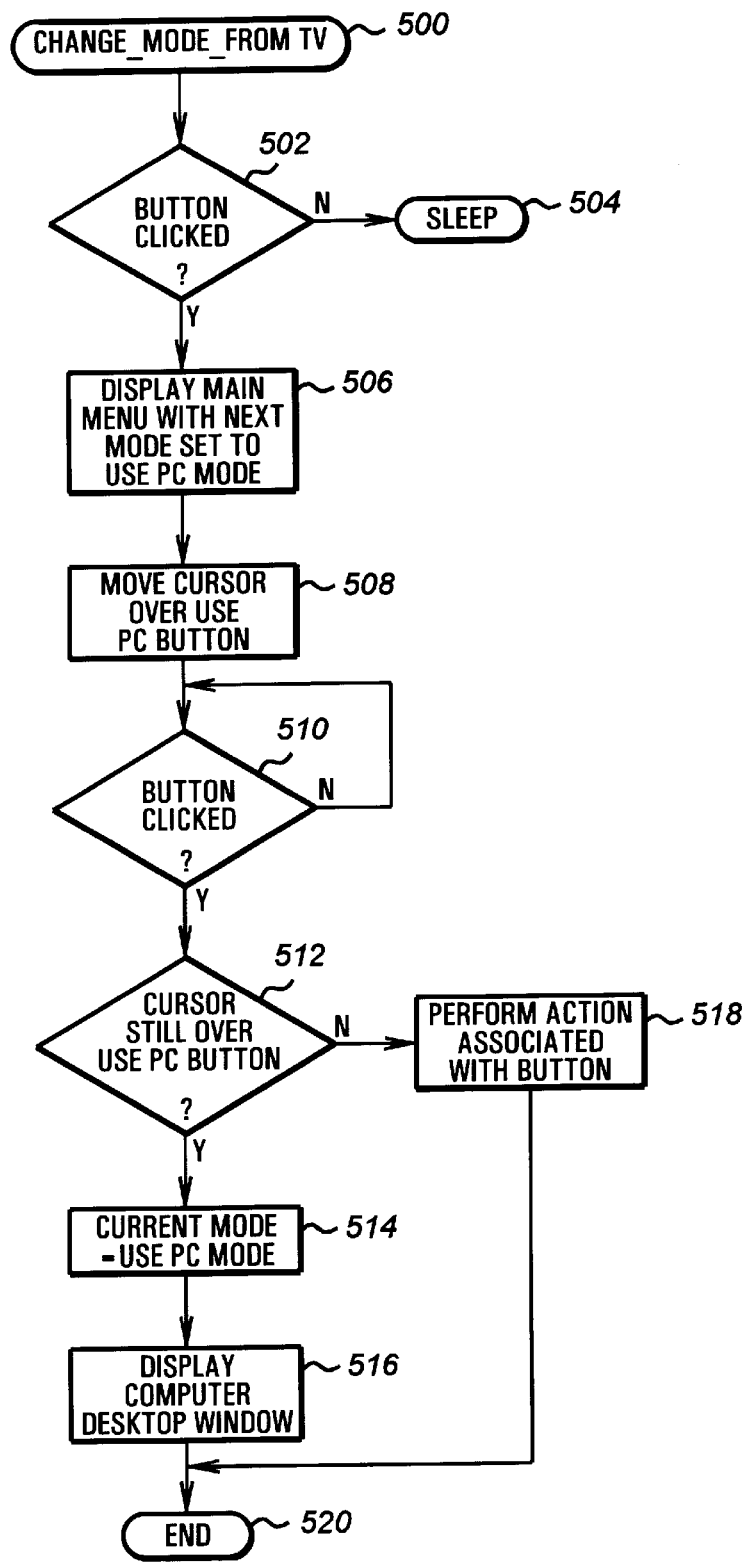
FIG. 10 is a flowchart illustrating the process for changing a mode from the TV mode to the computer mode in the home theater computer system of FIG. 1A.

FIG. 10 illustrates the process for changing the mode from the TV mode to the personal computer mode. Starting from step 500, the routine of FIG. 10 proceeds to step 502 where it checks whether the user wishes to perform a mode change. This is detected in the activation of a particular button on the mouse, the keyboard or the remote control console. Thus, in step 502, in the event that the user does not wish to change mode, the routine proceeds from step 502 to step 504 where the system sleeps until the button has been actuated.

Alternatively, in the event that the user indicates that the mode is to be changed, the button closure is detected in step 502 and the routine of FIG. 10 proceeds to step 506 where it detects the next mode as a function of the current mode and displays the main menu with the next mode set to the Use PC mode, as the Use PC mode is the next state following the existing state of Watch TV.

From step 506, the routine proceeds to step 508 where the cursor is positioned over the Use PC button to set the home theater personal computer in a mode where a subsequent button closure would actually confirm the modal change request. Thus, from step 508, the routine proceeds to step 510 where it awaits the modal change button closure. Until a button has been clicked or depressed, the routine simply loops back to itself. When a button in the main menu has been activated, the process of FIG. 10 proceeds from step 510 to step 512 where the routine further checks whether or not the cursor is still positioned over the Use PC button. If so, the routine proceeds from step 512 to step 514 where it sets the current mode to the Use PC mode which in the preferred embodiment is the next mode after the Watch TV mode. From step 514, the routine proceeds to step 516 where it displays the computer desktop window as that is the window associated with the use PC mode. From step 516, the routine of FIG. 10 exits in step 520.

Referring back to step 512, in the event that the cursor is positioned outside of the active region representing the Use PC button, the routine of FIG. 10 cancels the modal change request and instead performs the action associated with the particular button that the cursor is positioned over. Alternatively, in the event that the cursor is positioned over an empty region, no action would be taken in step 518. From step 518, the routine of FIG. 10 then exits via step 520.

Figure 11:
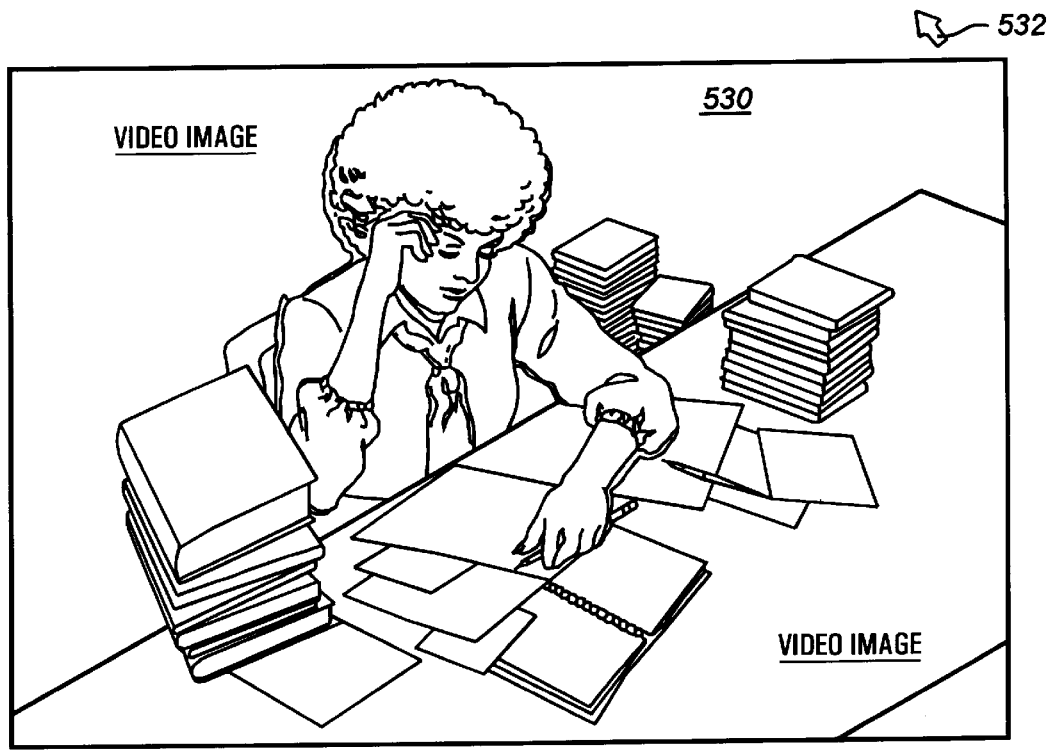
FIG. 11 is an illustration of a screen of the home theater personal computer system of FIG. 1A when it is in the television mode.
Figure 12:
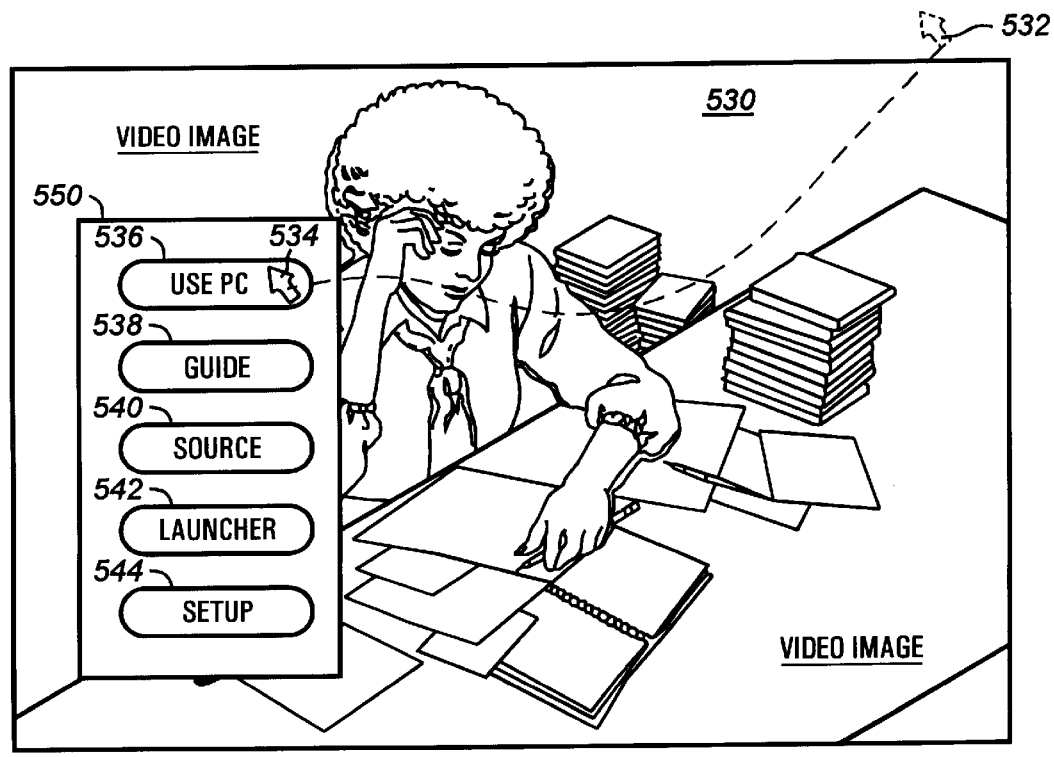
FIG. 12 is an illustration of the screen of the home theater personal computer system of FIG. 1A when a modal change has been requested.

The impact of the modal change from the Watch TV mode is illustrated in FIGS. 11 and 12. In FIG. 11, the home theater personal computer system of FIG. 1A is operating in the Watch TV mode and video images are displayed on the screen 530. Turning now to FIG. 12, the effect of the modal change request is illustrated. In FIG. 12, a main menu 550 is overlayed above the display 530. Within the main menu 550 are a plurality of buttons, including a Use PC button 536, a Guide button 538, a Source button 540, a Launcher button 542 and a Set-up button 544. Further, upon detecting the modal change request, the cursor 532 is moved from its parking position 532 and positioned in a new position 534 over the modal change switch.

Figure 14:
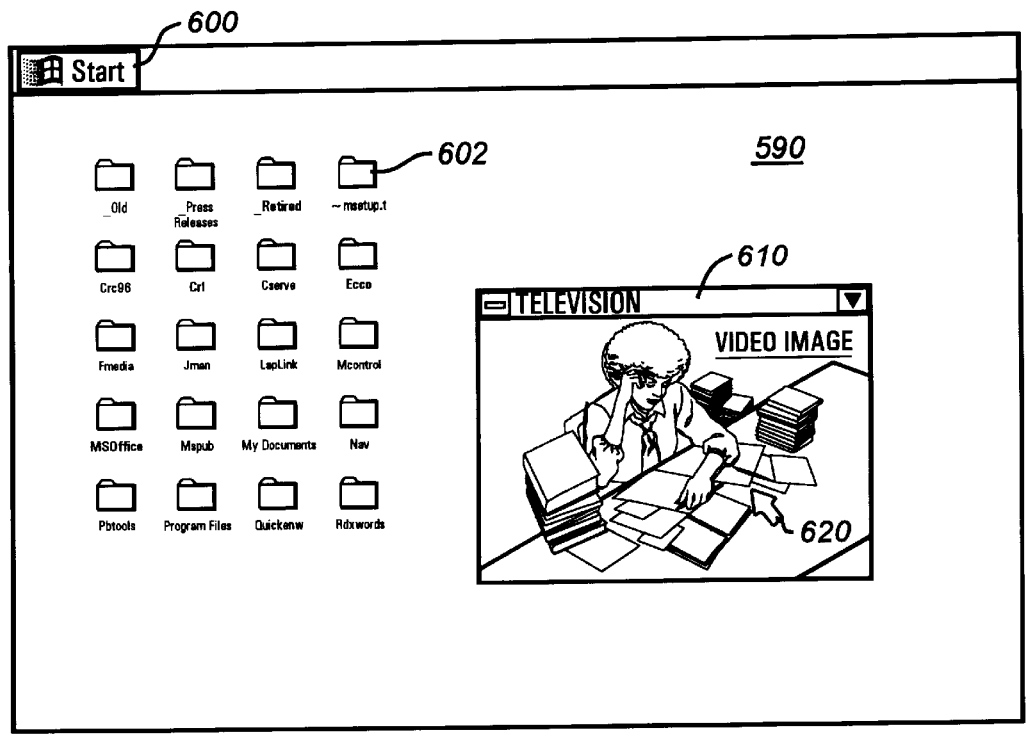
FIG. 14 is an illustration of the display of the home theater personal computer system of FIG. 1A when it operates in the computer mode.

As shown in FIG. 12, the new cursor is positioned over the Use PC button 536, thus preparing the modal change process to accept a confirmation of the modal change request. At this stage, in the event that the user confirms the modal change request by clicking the modal change button a second time, the home theater personal computer of the prevent invention transitions from the Watch TV mode to the Use PC mode and displays the computer desktop screen as shown in FIG. 14.

Figure 13:
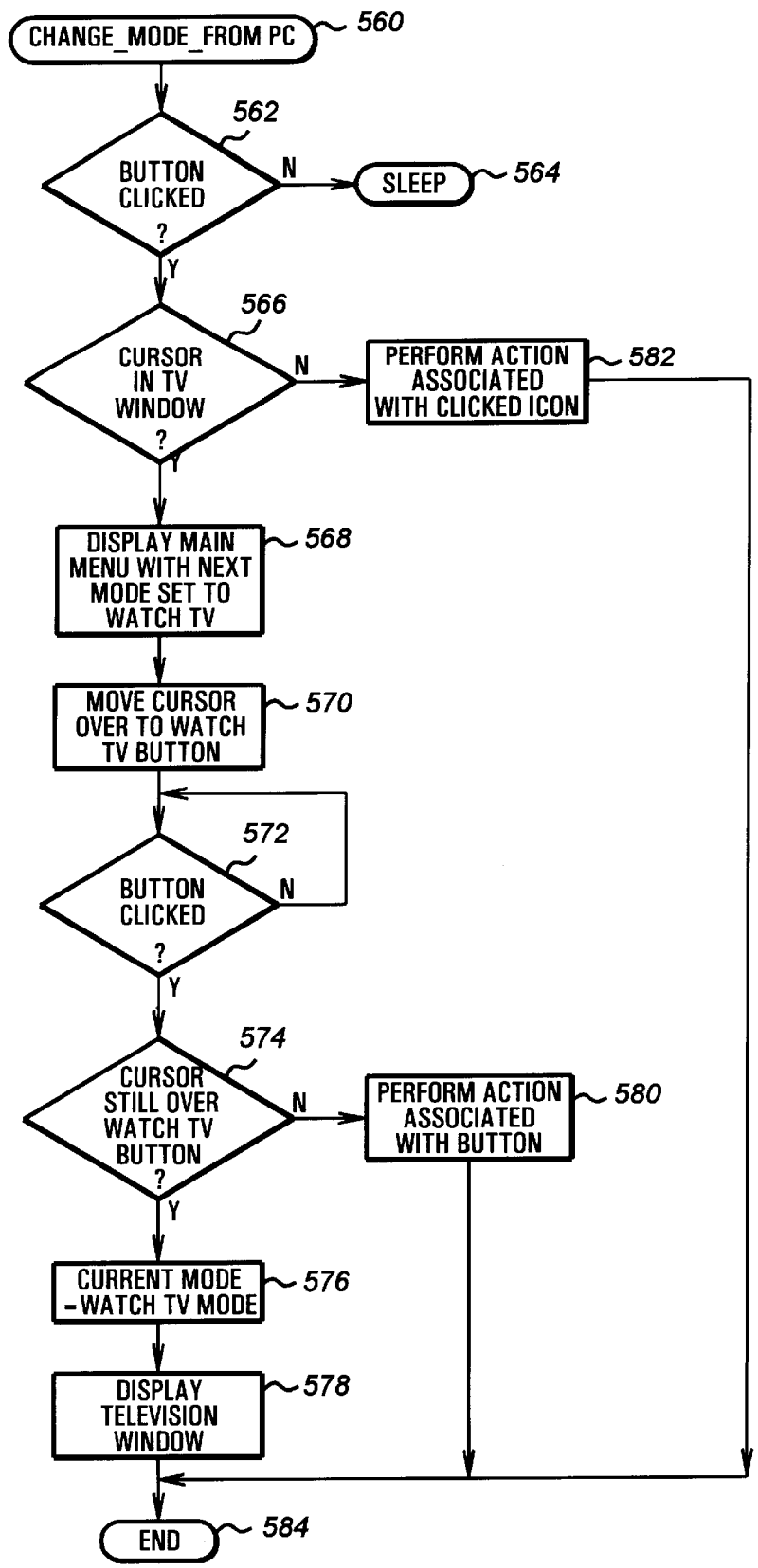
FIG. 13 is a flowchart illustrating the process for changing the mode from the PC mode to the TV mode in accordance with the present invention.

Referring now to FIG. 13, the process for changing the mode from the Use PC mode to the Watch TV mode is illustrated in detail. In FIG. 13, upon entering the routine in step 560, the routine checks whether the user has requested a modal change by detecting the modal change button closure in step 562. In step 562, in the event that the user did not request a mode change, the routine of FIG. 13 simply proceeds from step 562 to step 564 where the system sleeps until the button has been actuated.

Alternatively, in the event that the user desires a mode change, the routine of FIG. 13 proceeds from step 562 to step 566 where it checks whether the cursor is in the appropriate television window which provides the context for the mode change request. Thus, if the cursor is outside of the television window, the normal PC functionality would be provided.

In the preferred embodiment, the cursor needs to be positioned within a television window 610 (FIG. 14) in order to cause a mode change to the Watch TV mode. Thus, from step 566, in the event that the cursor is in the active region associated with the television window, the routine proceeds to step 568 where it displays a main menu 640 (FIG. 15) with the next mode set to the Watch TV mode, as shown in button 624 of FIG. 15. Further, from step 568, the routine proceeds to step 570 where the cursor is positioned over the Watch TV button. From step 570, the routine awaits the user confirmance of the modal change in step 572. Thus, if the modal change button is not selected or is cancelled, the routine loops back to itself in step 572. Alternatively, in the event of a button closure, the routine proceeds from step 572 to step 574 where it checks whether the cursor is still positioned over the Watch TV button. If so, the routine proceeds from step 574 to step 576 where it sets the current mode to the Watch TV mode. Further, the routine of FIG. 13 then displays the television window in step 578, as that window is the appropriate window corresponding to the current mode of Watch TV. From step 578, the routine of FIG. 13 simply exits in step 584.

Referring back to step 566, in the event that the cursor is not in the TV window, indicating that another action rather than a modal change has been requested, the routine of FIG. 13 proceeds from step 566 to step 582 where it performs actions associated with a clicked icon, or in the event that the mouse is clicked over an empty region, nothing happens. From step 582, the routine of FIG. 13 exits via step 584.

Referring further to step 574, in the event that the cursor is not positioned over the Watch TV button in step 574, the routine of FIG. 13 expects that the user wishes to perform another action rather than to change the mode. In this event, the routine proceeds from step 574 to step 580 where it performs the action associated with a particular button being selected, or in the event that the cursor is positioned over the background, does nothing. From step 580, the routine of FIG. 13 exits via step 584.

Figure 15:
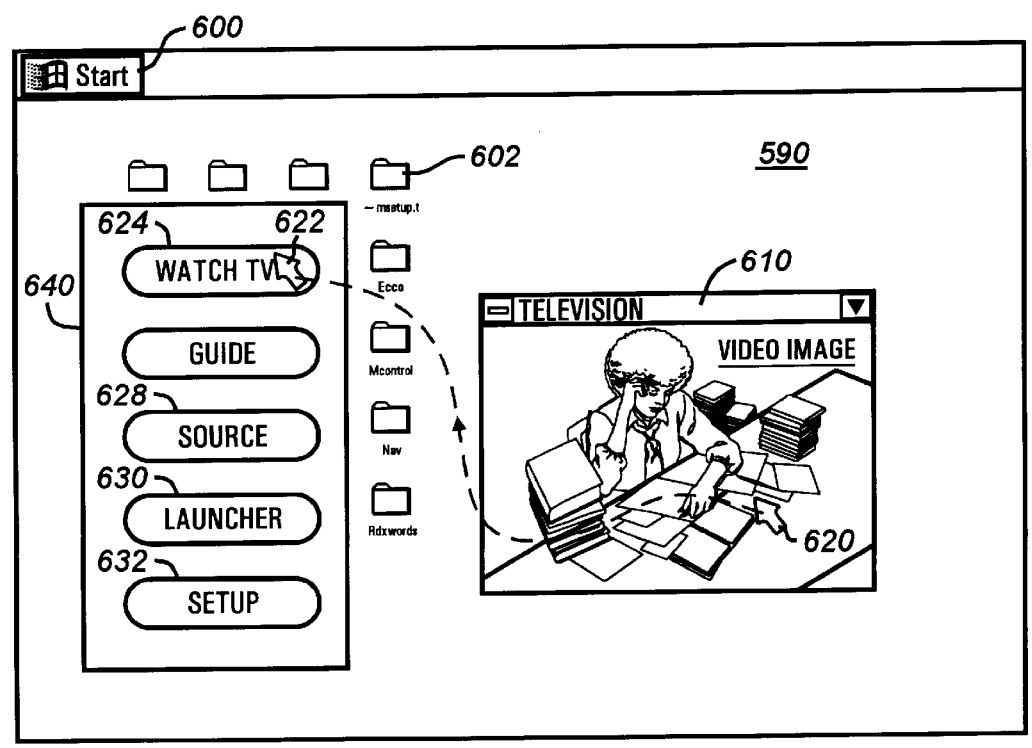
FIG. 15 is an illustration of the display of the home theater personal computer system of FIG. 1A when a mode change has been requested to change from the computer mode to the TV mode.

Referring now to FIGS. 14 and 15, the impact of the modal change from the Use PC mode to the Watch TV mode is illustrated in detail. In FIG. 13, the home theater personal computer system of FIG. 1A is operating in the Use PC mode and thus the desktop associated with the disk operating system user interface is displayed in FIG. 14. As Windows-95 is used in the preferred embodiment, a start icon 600 is positioned at a Window-95 task bar above the desktop region. Additionally, a plurality of representative folders 602 are positioned over a computer desktop interface 590. Additionally, a television window 610 is displayed within the computer desktop interface 590. As long as the user is clicking outside of the television window 610 of FIG. 14, normal interactions with the operating system and associated software are provided. However, if the mouse is positioned and activated within the active region of the television window 610, such as the mouse position 620 of FIG. 14, the home theater personal computer of FIG. 1A acts in response to the modal change request.

Turning now to FIG. 15, upon detecting the first button click indicating that the user wishes to change mode, the home theater personal computer system of FIG. 1A determines the current mode as the Use PC mode and that the next mode is the Watch TV mode. As such, the home theater personal computer system of FIG. 1A displays a main menu 640 having a plurality of buttons: a Watch TV button 624, a Guide button 626, a Source button 628, a Launcher button 630 and a Set-up button 632. Further, upon detecting the first button closure indicating a desire to perform a modal change, the cursor is moved from the position 620 in FIG. 14 to be placed over the Watch TV button 624 in a new cursor position 622, as shown in FIG. 15. As such, the home theater personal computer system of FIG. 1A is set up to perform a mode change upon confirming such mode change with the user. The user can simply confirm this mode change by clicking the button once more. On receipt of the second mode change button click, the home theater personal computer system of FIG. 1A updates the current mode to the Watch TV mode and displays the television image such as the image of FIG. 11. In this manner, the mode changes are cycled in a round-robin fashion.

Turning now to specifics on the main menu 640 of FIG. 15, in the preferred embodiment, the Main Menu contains two buttons and six menu choices which the user can use to maneuver in the Main Menu system. Thus, to select an item, the user can point to a particular button and select it using the trigger on the back of the remote control 124 or the left selector button on the mouse. Specifics on the preferred main menu are as follows:

| Name | Main Menu Items Function |
|---|---|
| Go Back | Takes the user back to the previous screen or menu. All menus have a Go Back button that the user can select at any time. When Go Back is selected from the Main Menu screen, the Main Menu system returns the user to the user's original channel or input source. |
| Help | Calls up the PC Theater Online User's Guide, which provides the user with help using the system. All menus have a Help button that the user can select at any time. |
| Watch TV/ User PC | Switches between TV mode (allows the user to watch full-screen TV) and PC mode (allows the user to work in Windows, play computer video games, and watch TV in a window). |
| Guide | Calls up the electronic program guide, which provides the user with program schedules for the shows being broadcast in the area. Allows the user to switch to the correct input source for the device the user wants to watch. |
| Source | Choices include:<br>* TV-for TV signals.<br>* Composite Video 1, 2, and 3-for devices that use computer video signals, such as a VCR, laser disc, among others.<br>* S-Video 1 and 2-for devices that use S-video signals |
| Launcher | Allows the user to launch other computer programs from this menu without having to start Windows first. Selecting this button automatically switches the system to the Use PC mode. |
| Setup | Allows the user to adjust the system settings based on personal preferences. |

In the manner discussed above, the present invention allows users to quickly effect a modal change in an appliance having a plurality of modes. In sum, the apparatus captures a user actuation indicative of a modal change. The user actuation may be a mouse button closure, a keyboard button closure, or a remote console control button closure. Upon detecting the user actuation indicative of a modal change, the apparatus detects the current mode for the appliance. Based on the current mode of the appliance, the apparatus cycles to the next mode in a round-robin basis and sets the next mode to become the current mode for the appliance. Further, in setting the next mode, the apparatus displays the next mode of the appliance as a mode change item in a menu list. The apparatus also then requests a second user actuation confirming a modal change. Further, in the event that the user confirms the modal change, the apparatus sets the next mode of the appliance to be the current mode for the appliance and maximizes the window associated with the mode of the appliance.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A method for displaying information on an appliance having first and second modes, wherein said appliance is a home theater computer and wherein said first mode is a computer mode and said second mode is a video viewing mode, said method comprising:

capturing a user actuation indicative of a modal change;

displaying a first window when said appliance operates in said first mode and displaying a second window when said appliance operates in said second mode;

displaying a computer desktop in said first window and displaying video images in said second window;

detecting a current mode for said appliance;

automatically selecting a next mode of said appliance by sequentially cycling through all modes on a round-robin basis;

displaying said next mode of said appliance;

setting said next mode of said appliance as the mode for said appliance;

maximizing the window associated with the mode of said appliance; and parking a cursor in a hidden location until a next user actuation indicative of a mode change.

2. The method of claim 1, further comprising the step of displaying video images in said second window within said computer desktop of said first window when said appliance operates in said computer mode.

3. The method of claim 1, wherein said setting step further comprises:

requesting a user actuation confirming a modal change; and if the user confirmed said modal change, setting said next mode of said appliance as the mode for said appliance and otherwise retaining said current mode as the mode of said appliance.

4. The method of claim 3, wherein said requesting step further comprises the step of selecting said mode change item as a default choice in a menu, wherein said menu contains the selected next mode and other non-mode-change items.

5. The method of claim 1, wherein said capturing a user actuation step further comprises the step of clicking a button once.

6. The method of claim 1, wherein said capturing a user actuation step further comprises the step of clicking a button more than once.

7. An appliance for displaying information, said appliance having first and second modes, wherein said appliance is a home theater computer and wherein said first mode is a computer mode and said second mode is a video viewing mode, said appliance comprising:

a processor;

a memory coupled to said processor;

a data storage device coupled to said processor;

a video display coupled to said processor;

means for displaying a first window when said appliance operates in said first mode and displaying a second window when said appliance operates in said second mode;

means for displaying a computer desktop in said first window and displaying video images in said second window;

means for capturing a user actuation indicative of a modal change;

means for detecting a current mode for said appliance;

means for selecting a next mode by sequentially cycling through all modes on a round-robin basis;

means for displaying a next mode of said appliance;

means for setting said next mode of said appliance as the mode for said appliance;

means for maximizing the window associated with the mode of said appliance; and means for parking a cursor in a hidden location until a next user actuation indicative of a mode change.

8. The appliance of claim 7, further comprising a means for displaying video images in said second window within said computer desktop of said first window when said appliance operates in said computer mode.

9. The appliance of claim 7, wherein said setting means further comprises:

means for requesting a user actuation confirming a modal change; and means for detecting if the user confirmed said modal change, setting said next mode of said appliance as the mode for said appliance and otherwise retaining said current mode as the mode of said appliance.

10. The appliance of claim 9, wherein said requesting means further comprises a means for selecting said mode change item as a default choice in a menu wherein said menu contains the selected next mode and other non-mode-change items.

11. The appliance of claim 7, wherein said means for capturing a user actuation further comprises a means for detecting a button click once.

12. The appliance of claim 7, wherein said means for capturing a user actuation further comprises a means for detecting a button click more than once.

13. A program storage device having a computer readable program code embodied therein for displaying information on an appliance having first and second modes, wherein said appliance is a home theater computer and wherein said first mode is a computer mode and said second mode is a video viewing mode, said program storage device comprising:

code that displays a first window when said appliance operates in said first mode and that displays a second window when said appliance operates in said second mode;

code that displays a computer desktop in said first window and displays video images in said second window;

code that captures a user actuation indicative of a modal change;

code that detects a current mode for said appliance;

code that automatically selects a next mode of said appliance by sequentially cycling through all modes on a round-robin basis;

code that displays said next mode of said appliance;

code that sets said next mode of said appliance as the mode for said appliance;

code that maximizes the window associated with the current mode of said appliance; and code that parks a cursor in a hidden location until a next user actuation indicative of a mode change.

14. A program storage device of claim 13, further comprising a code that displays video images in said second window within said computer desktop of said first window when said appliance operates in said computer mode.

15. The program storage device of claim 13, wherein said setting code further comprises:

code that displays said next mode of said appliance as a mode change item in a menu list wherein said menu list contains other non-mode-change items;

code that requests a user actuation confirming a modal change;

code that detects if the user confirmed said modal change, sets said next mode of said appliance as the mode for said appliance and otherwise retains said current mode as the mode of said appliance.

16. The program storage device of claim 15, wherein said requesting code further comprises a code that selects said mode change as a default choice in said menu list.

17. The program storage device of claim 13, wherein said code for capturing a user actuation further comprises a code that detects a button click once.

18. The program storage device of claim 13, wherein said code that captures a user actuation further comprises a code that detects a button click more than once.

19. A home theater computer, wherein said home theater computer has a first mode and a second mode, wherein said first mode is a computer mode and said second mode is a video viewing mode, comprising:
   a processor;
   a processor;
   a memory coupled to said processor; and
   a data storage device coupled to said processor, said data storage device having:
      code for displaying a first window when said home theater computer operates in said first mode and displaying a second window when said home theater computer operates in said second mode;
      code for displaying a computer desktop in said first window and displaying video images in said second window;
      code for capturing a user actuation indicative of a modal change from said personal computer mode to said video viewing mode;
      code for detecting a current mode for said home theater computer;
      code for selecting a next mode of said home theater computer based on said current mode of said home theater computer, comprising a code for sequentially cycling through all modes on a round-robin basis;
      code for setting said next mode of said appliance as the mode for said home theater computer;
      code for maximizing the window associated with the mode of said home theater computer; and
      code for parking a cursor in a hidden location until a next user actuation indicative of a mode change.

20. The home theater computer of claim 19, further comprising a code for displaying video images in said second window within said computer desktop of said first window when said home theater personal computer operates in said computer mode.

21. The home theater computer of claim 19, wherein said setting code further comprises:
   code for displaying said next mode of said appliance as a mode change item in a menu list, wherein said menu list comprises other non-mode-change items;
   code for requesting a user actuation confirming a modal change;
   code for detecting if the user confirmed said modal change, setting said next mode of said home theater computer as the mode for said home theater computer and otherwise retaining said current mode as the mode of said home theater computer.

22. The home theater computer of claim 21, wherein said requesting code further comprises a code for selecting said mode change item as a default choice in said menu list.

23. The home theater computer of claim 19, wherein said capturing a user actuation code further comprises a code for detecting a button click once.

24. The home theater computer of claim 19, wherein said capturing a user actuation code further comprises a code for detecting a button click more than once.

25. An appliance for displaying information, said appliance having first and second modes, wherein said appliance is a home theater computer and wherein said first mode is a computer and said second mode is a video viewing mode, said appliance comprising:
   a processor;
   a memory coupled to said processor;
   a data storage device coupled to said processor;
   a video display coupled to said processor;
   a graphics generator for displaying a first window when said appliance operates in said first mode and displaying a second window when said appliance operates in said second mode;
   code for displaying a computer desktop in said first window and displaying video images in said second window;
   an input device for capturing a user actuation indicative of a modal change;
   a mode detector for sensing a current mode for said appliance;
   a mode selector for picking a next mode of said appliance based on said current mode of said appliance, wherein said mode selector sequentially cycles through all modes on a round-robin basis;
   a menu for showing the next mode of said appliance, wherein said menu comprises other non-mode-change items;
   a switch for setting said next mode of said appliance as the mode for said appliance; and
   a code for maximizing the window associated with the mode of said appliance; and
   a code for parking the cursor in a hidden location until a next user actuation indicative of a mode change.

26. The appliance of claim 25, further comprising a code for displaying video images in said second window within said computer desktop of said first window when said appliance operates in said computer mode.

27. The appliance of claim 25, wherein said switch further comprises:
   code for requesting a user actuation confirming a modal change;
   code for detecting if the user confirmed said modal change, setting said next mode of said appliance as the mode for said appliance.

28. A method for operating a home theater computer, comprising:
   capturing a user actuation indicative of a modal change from a personal computer mode to a video viewing mode;
   detecting a current mode for said home theater computer;
   selecting a next mode of said home theater computer based on said current mode of said home theater computer, wherein said step for selecting the next mode comprises the step of sequentially cycling through all modes on a round-robin basis;
   setting next mode of said home theater personal computer as the mode for said home theater computer;
   maximizing the window associated with the mode of said home theater computer; and
   parking a cursor in a hidden location until a next user actuation indicative of a mode change.

29. The method of claim 28, wherein said setting step further comprises:
   requesting a user actuation confirming a modal change;
   if the user confirmed said modal change, setting said next mode of said home theater computer as the mode for said home theater computer and otherwise retaining said current mode as the mode of said home theater computer.

30. The method of claim 29, wherein said requesting step further comprises the step of selecting said mode change item as a default choice in a menu, said menu comprising other non-modal-change items.

* * * * *